(12) United States Patent
Li et al.

(10) Patent No.: US 12,408,157 B2
(45) Date of Patent: *Sep. 2, 2025

(54) DYNAMIC CHANNEL STATE INFORMATION (CSI) MEASUREMENT GAP FOR BANDWIDTH LIMITED LOW COMPLEXITY USER EQUIPMENTS

(71) Applicant: QUALCOMM Incorporated, San Diego, CA (US)

(72) Inventors: Qiaoyu Li, Beijing (CN); Chao Wei, Beijing (CN); Yu Zhang, San Diego, CA (US); Peter Pui Lok Ang, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 17/794,587

(22) PCT Filed: Jan. 23, 2020

(86) PCT No.: PCT/CN2020/073990
§ 371 (c)(1),
(2) Date: Jul. 21, 2022

(87) PCT Pub. No.: WO2021/147079
PCT Pub. Date: Jul. 29, 2021

(65) Prior Publication Data
US 2023/0144865 A1    May 11, 2023

(51) Int. Cl.
*H04W 72/0457* (2023.01)
*H04W 72/0446* (2023.01)
(Continued)

(52) U.S. Cl.
CPC .... *H04W 72/0457* (2023.01); *H04W 72/0446* (2013.01); *H04W 72/0453* (2013.01); *H04W 72/23* (2023.01); *H04W 72/54* (2023.01)

(58) Field of Classification Search
CPC ......... H04W 72/0457; H04W 72/0446; H04W 72/0453; H04W 72/23; H04W 72/54;
(Continued)

(56) References Cited

U.S. PATENT DOCUMENTS

2015/0049689 A1* 2/2015 Seo ...................... H04L 5/0057
370/329
2019/0098523 A1* 3/2019 Muruganathan ..... H04B 7/0626
(Continued)

FOREIGN PATENT DOCUMENTS

CN    109982431 A    7/2019
CN    110249571 A    9/2019
(Continued)

OTHER PUBLICATIONS

LG Electronics: "Remaining issues on bandwidth parts", 3GPP Draft; R1-1717972 [retrieved on Oct. 8, 2017] (Year: 2017).*
(Continued)

*Primary Examiner* — Abdullahi E Salad
(74) *Attorney, Agent, or Firm* — Loza & Loza, LLP

(57) ABSTRACT

A user equipment for wireless communication is provided. The UE operates within an active bandwidth part (BWP) of a component carrier, wherein the active BWP is a portion of a total bandwidth of the component carrier, determines a configuration for a dynamic channel state information (CSI) measurement gap, the dynamic CSI measurement gap including channel state information (CSI) measurement resources having a frequency domain occupation within the total bandwidth of the component carrier and outside of the active BWP, measures the CSI measurement resources
(Continued)

included in the dynamic CSI measurement gap, and transmits a CSI report based on the measured CSI measurement resources.

36 Claims, 8 Drawing Sheets

(51) Int. Cl.
    *H04W 72/0453*     (2023.01)
    *H04W 72/23*     (2023.01)
    *H04W 72/54*     (2023.01)

(58) Field of Classification Search
    CPC .... H04W 8/24; H04W 36/0094; H04L 5/005; H04L 5/0092; H04L 5/001
    See application file for complete search history.

(56) References Cited

U.S. PATENT DOCUMENTS

| | | | |
|---|---|---|---|
| 2019/0141546 A1 | 5/2019 | Zhou et al. | |
| 2019/0149305 A1* | 5/2019 | Zhou | H04L 5/0092 370/330 |
| 2021/0203464 A1* | 7/2021 | Ren | H04L 5/0007 |
| 2021/0367741 A1* | 11/2021 | Yiu | H04L 5/0007 |
| 2022/0078658 A1* | 3/2022 | Muruganathan | H04B 7/0626 |
| 2022/0256458 A1* | 8/2022 | Noh | H04W 72/1263 |
| 2023/0106254 A1 | 4/2023 | Li et al. | |

FOREIGN PATENT DOCUMENTS

| | | | |
|---|---|---|---|
| CN | 110431759 A | 11/2019 | |
| EP | 3644523 A1 * | 4/2020 | H04B 17/24 |
| WO | 2019066622 A1 | 4/2019 | |

OTHER PUBLICATIONS

Intel Corporation: "Remaining Details for Bandwidth Parts", 3GPP TSG RAN WG1 Meeting 91, R1-1720100, Reno, USA, Nov. 27-Dec. 1, 2017, pp. 1-4.
International Search Report and Written Opinion—PCT/CN2020/073990—ISA/CN—Oct. 26, 2020.
LG Electronics: "Remaining Issues on Bandwidth Parts", 3GPP TSG RAN WG1 Meeting 90bis, R1-1717972, Prague, CZ, Oct. 9-13, 2017, pp. 1-8, Chapters 1, 2.4 and 2.5, https://www.3gpp.org/ftp/tsg_ran/WG1_RL1/TSGR1_90b/Docs/R1-1717972.zip, Chapters 1, 2.4 and 2.5.
Mediatek Inc: "Remaining Issues and Changes in RRM", 3GPP TSG RAN WG1 Meeting #92, R1-1801636, Athens, Greece, Feb. 26-Mar. 2, 2018, pp. 1-6.
Supplementary European Search Report—EP20915895—Search Authority—The Hague—Sep. 25, 2023.

* cited by examiner

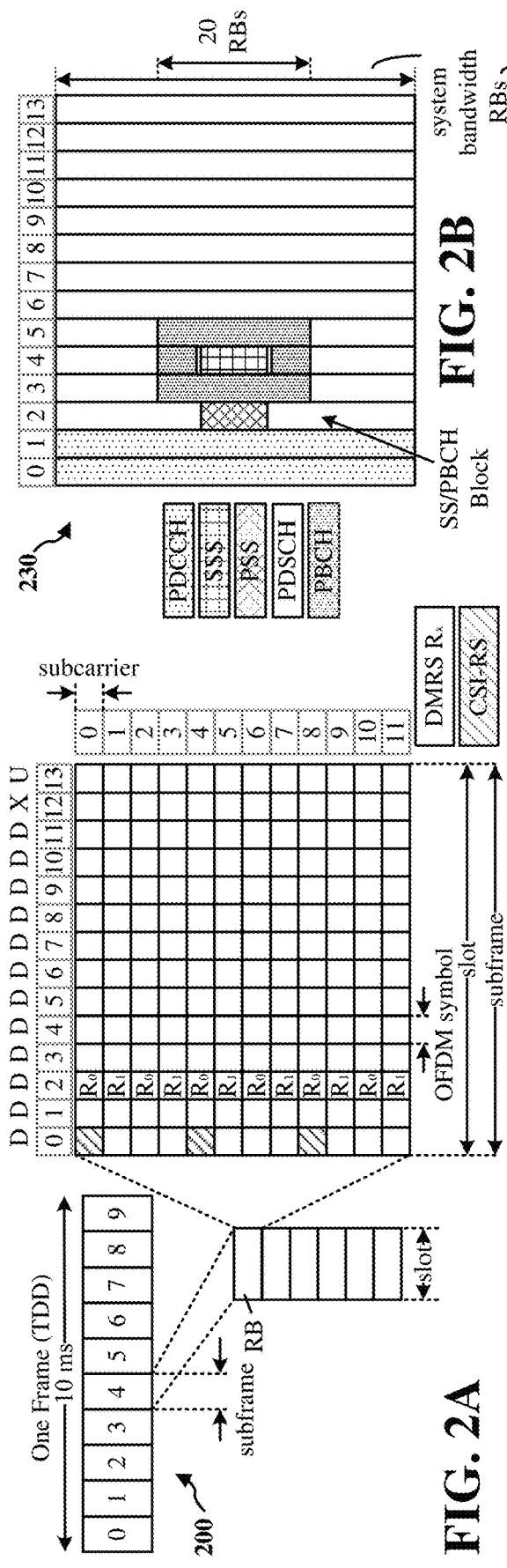
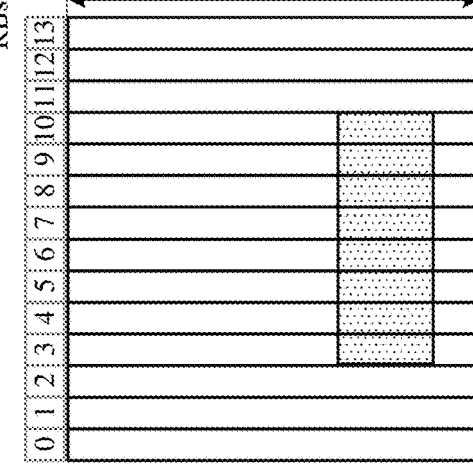
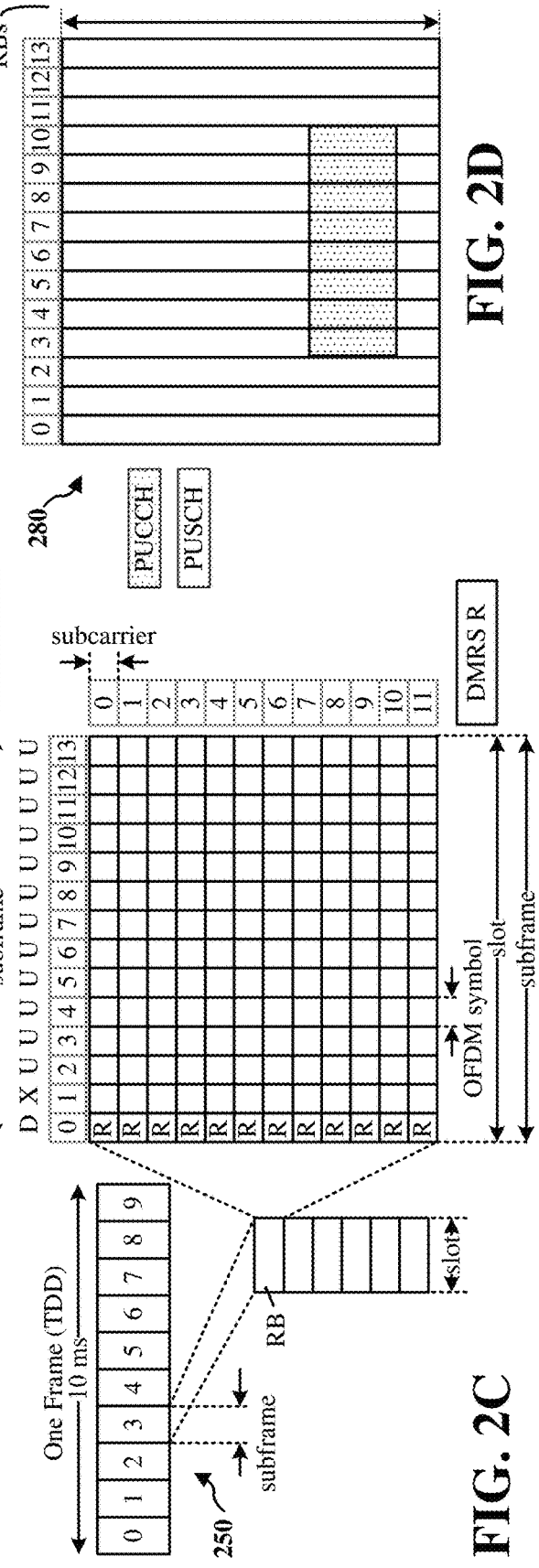

DYNAMIC CHANNEL STATE INFORMATION (CSI) MEASUREMENT GAP FOR BANDWIDTH LIMITED LOW COMPLEXITY USER EQUIPMENTS

CROSS-REFERENCE TO RELATED APPLICATION

This application is a national stage application filed under 35 U.S.C. 371 based on Patent Cooperation Treaty (PCT) Application Serial No. PCT/CN2020/073990, filed on Jan. 23, 2020, entitled "DYNAMIC CHANNEL STATE INFORMATION (CSI) MEASUREMENT GAP FOR BANDWIDTH LIMITED LOW COMPLEXITY USER EQUIPMENTS", which is assigned to the assignee hereof and which is expressly incorporated by reference herein in its entirety.

BACKGROUND

Technical Field

The present disclosure relates generally to communication systems, and more particularly, to a dynamic channel state information (CSI) measurement gap for bandwidth limited low complexity user equipment (UEs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDTA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment for wireless communication is provided. The UE operates within an active bandwidth part (BWP) of a component carrier, wherein the active BWP is a portion of a total bandwidth of the component carrier, determines a configuration for a dynamic channel state information (CSI) measurement gap, the dynamic CSI measurement gap including channel state information (CSI) measurement resources having a frequency domain occupation within the total bandwidth of the component carrier and outside of the active BWP, measures the CSI measurement resources included in the dynamic CSI measurement gap, and transmits a CSI report based on the measured CSI measurement resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
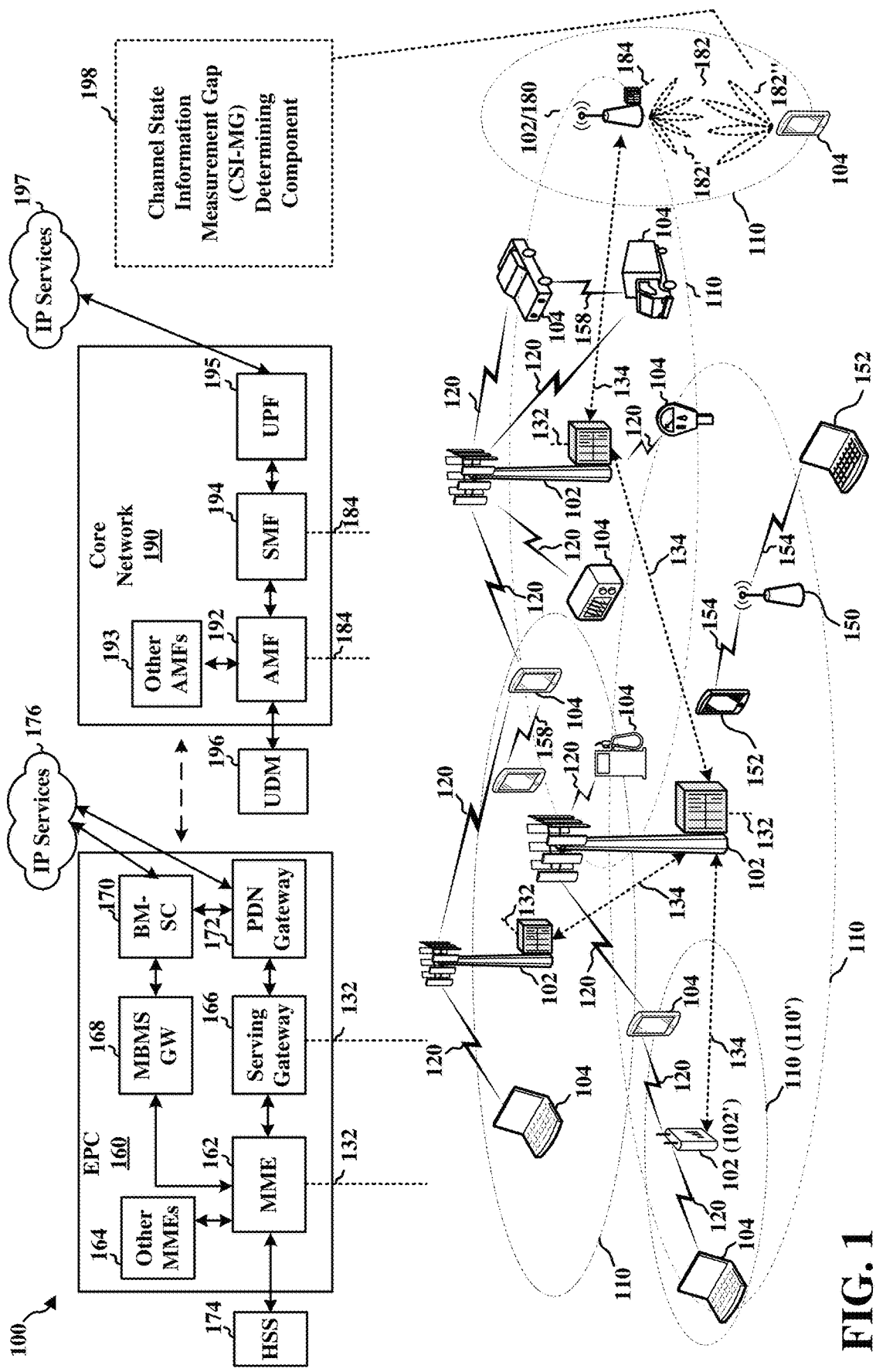
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), intercell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102' employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beam formed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a dynamic channel state information (CSI) measurement gap determining component 198. The dynamic CSI measurement gap may include CSI resources (e.g., CSI resources transmitted by the base station 102) that are within the total bandwidth of a component carrier and outside of an active bandwidth part of the UE 104.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may implement a frequency domain division (FDD) scheme in which for a particular set of subcarriers (carrier system bandwidth), subframes within the set of subcarriers are dedicated for either DL or UL, or may implement a time domain division (TDD) scheme in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^{\mu*1.5}$ kKz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
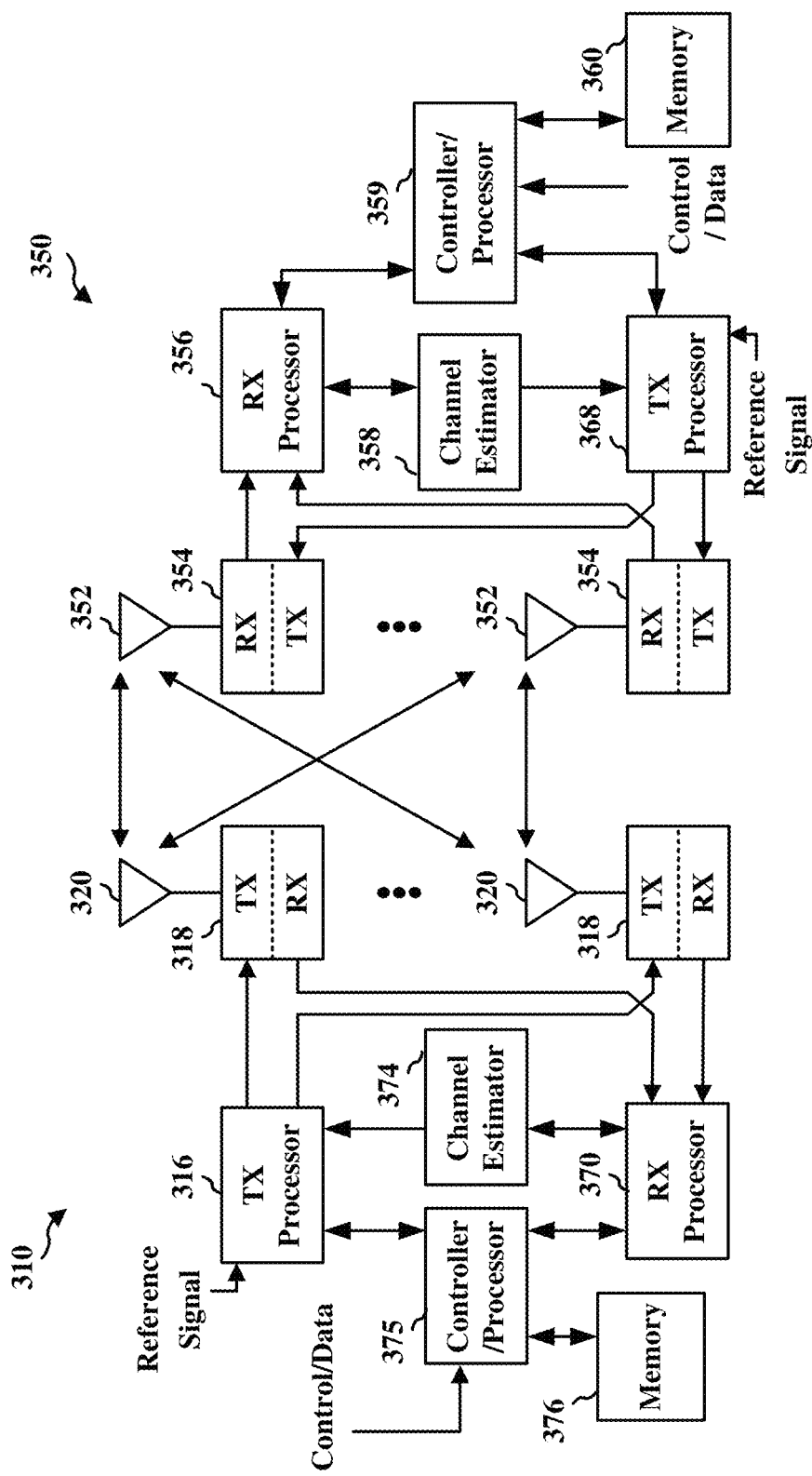
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions, Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL, transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the channel state information measurement gap (CSI-MG) determining component 198 of FIG. 1.

5G NR networks may implement a set of features (also referred to as NR-Light) that supports reduced complexity UEs. In some examples, reduced complexity UEs may include wearable devices, industrial sensors, video surveillance devices (e.g., stationary cameras), and/or other suitable devices. As compared to standard UEs smartphones), reduced complexity UEs may have a lower wireless transmission power, fewer antennas (e.g., antennas for transmitting and/or receiving), a reduced bandwidth for wireless transmission and/or reception, reduced computational complexity/memory, and/or longer battery life. For example, a reduced complexity UE may have a bandwidth in the range of 5.0 MHz to 20 MHz, while a standard UE may have a bandwidth of 100 MHz. One example goal of the present disclosure is to enhance co-existence among 5G NR reduced complexity UEs and 5G NR standard UEs.

5G NR networks may support very large operating bandwidths relative to previous generations of cellular networks (e.g., LTE). However, requiring a UE to operate across the entire bandwidth of a 5G NR network may introduce unnecessary complexities to the operation of the UE and may significantly increase a UE's power consumption. Therefore, to avoid the need for the operating bandwidth of a UE to match the full bandwidth (also referred to as a carrier bandwidth or a component carrier bandwidth) of a cell in a 5G NR network, 5G NR introduces the concept of a bandwidth part (BWP). For example, a BWP (e.g., a configured frequency band) may allow a UE to operate with a narrower bandwidth (e.g., for wireless transmission and/or reception) than the full bandwidth of a cell. In some examples, BWPs may allow UEs with different bandwidth capabilities to operate in a cell with smaller instantaneous bandwidths relative to the full bandwidth configured for the cell. In some examples, a UE may not be required to transmit and or receive outside of the BWP assigned to the UE (also referred to as an active BWP of the UE).

In some examples, for a paired spectrum, a serving cell may configure a maximum of four DL BWPs and four UL BWPs. For an unpaired spectrum, a serving cell may configure a maximum of four DL/UL BWP pairs. For a supplementary uplink (SUL), a serving cell may configure a maximum of 4 UL BWPs.

In some examples, for FFD, a serving cell may support separate sets of BWP configurations for DL and UL per component carrier (CC). DL and UL BWPs may be configured separately and independently for each UE-specific serving cell. The numerology of a DL BWP configuration may apply to PDCCH and PDSCH. The numerology of a UL BWP configuration may apply to PUCCH and PUSCH.

In some examples, for TDD, a serving cell may support a joint set of BWP configurations for DL and UL per CC. DL and UL BWPs may be jointly configured as a pair, with the restriction that the DL/UL BWP pair shares the same center frequency but may be of different bandwidths for each UE-specific serving cell for a UE. The numerology of the DL/UL BWP configuration may apply to PDCCH, PDSCH, PUCCH, and PUSCH. For a UE, if different active DL and UL BWPs are configured, the UE is not expected to retune the center frequency of the channel bandwidth between DL and UL. Supporting the ability to switch a BWP among multiple BWPs is memory consuming, since each BWP requires a whole set of RRC configurations.

In a 5G NR network, when a UE is to perform a channel state information (CSI) measurement, the UE may be expected to perform the CSI measurement only within its active DL BWP. Otherwise, to perform a CSI measurement outside of its active BWP (also referred to as a current active BWP), the UE may need to switch from its current active BWP to a different BWP (e.g., a different BWP that does not overlap with the current active BWP). Furthermore, and as described below, a UE may need measurement gaps (MGs) to identify and measure at least one of an intra-frequency cell, an inter-frequency cell, or an inter-RAT E-UTRAN cell.

Measurement gaps (MGs) may be RRC configured with a measurement gap length (MGL), a measurement gap repetition period (MGRP), and a measurement gap timing advance (MGTA). In some examples, the measurement gap length (MGL) may be within a range of 1.5 milliseconds (ms) to 6.0 ms depending on frequency range. In some examples, the measurement gap repetition period (MGRP) may be within a range of 20 ms to 160 ms. In some examples, the measurement gap timing advance (MGTA) may be 0 ms, 0,25 ms, or 0.5 ms. During a measurement gap (MG), the UE may not be expected to transmit or receive within the active BWP. In some examples, the previously described measurement gaps (MGs) may be used mainly for L3-based cell reselection or carrier reselection.

Radio resource control (RRC) for channel state information (CSI) reporting and CSI Resource Frequency Occupation will now be discussed. A UE may receive a CSI report configuration, which may define a CSI reporting band as a subset of subbands of the bandwidth part (BWP). The CSI reporting band may indicate a contiguous or non-contiguous subset of subbands in the BWP for which CSI is to be reported. The CSI reporting band may be indicated using a bitmap, such as a bit string where each bit in the bitstring represents one subband. For example, the right-most bit in the bit string may represents the lowest subband in the BWP. The number of subbands represented by the bitstring (e.g., the length of the bitstring) may be set based on a value or term included in a certain field (also referred to as a choice field) of the CSI report configuration. For example, "subbands3" may be included in the choice field to indicate three subbands, which may set the length of the bit string to three bits. As another example, "subbands4" may be included in the choice field to indicate four subbands, which may set the length of the bit string to four bits. The choice field may be omitted (or may not include any value) if there are less than 24 PRBs (no subband) and present otherwise. In some examples, the number of subbands may be from three (e.g., 24 PRBs, subband size 8) to 18 (e.g., 72 PRBs, sub band size 4).

A UE may receive a CSI resource configuration, which may indicate a CSI frequency occupation within the BWP. In some examples, the CSI frequency occupation may be indicated with a starting resource block value (also referred to as a startingRB value) and a number of resource blocks value (also referred to as a nrofRBs value). The starting resource block value indicates a physical resource block (PRB) where the CSI resource begins in relation to a common resource block #0 (CRB #0) on a common resource block grid. In some examples, only multiples of 4 may be allowed (e.g. 0, 4, . . . ). The number of resource blocks value indicates a number of PRBs across which the CSI resource spans. In some examples, only multiples of 4 may be allowed. The smallest configurable number may be the minimum of 24 and the width of the associated BWP. If the configured value is larger than the width of the corresponding BWP, the UE may assume that the actual CSI-RS bandwidth is equal to the width of the BWP.

In some 5G NR networks, a reduced complexity UE may only support a single BWP, due to the limited computational memory of the reduced complexity UE. In these 5G NR networks, when a base station (e.g., gNB) desires the reduced complexity UE to measure CSI resources (for L3 measurement or for L1 scheduling purposes) for frequency domain (FD) resources outside of its current active BWP, the base station (e.g., gNB) may need to first reconfigure the current active BWP of the reduced complexity UE. However, since such reconfiguration of the current BWP would typically require an RRC reconfiguration, a relatively long configuration delay would be introduced thereby degrading the performance of the low complexity UE. In addition, such RRC reconfiguration of the current BWP may delay transmission of an accurate CSI report, which may further limit PDSCH performance in the new frequency domain (FD) resource. The aspects described herein introduce dynamic channel state information (CSI) measurement gaps that overcome the previously described difficulties associated with UE measurements of CSI resources outside of the UEs current active BWP.

Dynamic Channel State Information (CSI) Measurement Gap

In some aspects of the present disclosure, and as described in greater detail with reference to FIGS. 4 and 5 below, a UE may be RRC configured with a dynamic CSI-Measurement Gap (d-CSI-MG) for CSI measurements outside of its current active BWP. In some examples, the dynamic CSI-Measurement Gap (d-CSI-MG) may include a front-end d-CSI-MG length (f-d-CSI-MGL) and a back-end d-CSI-MG length (b-d-CSI-MGL). The f-d-CSI-MGL may define a time domain (TD) duration of the d-CSI-MG before the first symbol of a first CSI resource. The b-d-CSI-MGL may define a time domain (TD) duration of the d-CSI-MG after the last symbol of a second CSI resource. In some aspects of the disclosure, the first CSI resource may be the earliest CSI resource associated with a first CSI-report triggered by a first DCI, and the second CSI resource may be the latest CSI resource also associated with the first CSI-report triggered by the first DCI. In some examples, the f-d-CSI-MGL and b-d-CSI-MGL may be configured by a same value. In some aspects of the disclosure, the start of the dynamic CSI-Measurement Gap (d-CSI-MG) may be defined by the first symbol of the f-d-CSI-MGL and the end of the dynamic CSI-Measurement Gap (d-CSI-MG) may be defined by the last symbol of the b-d-CSI-MGL.

In some aspects of the disclosure, a UE is not expected to transmit and/or receive with respect to its active BWP during the dynamic CSI-Measurement Gap (d-CSI-MG). In one example, if the 5G NR network implements a time division duplex (TDD) scheme, both transmissions and receptions by the UE may not be expected. In another example, if the 5G NR network implements a frequency division duplex (FDD) scheme, only receptions by the UE are not expected, while transmissions by the UE may be expected. In another example, if FDD, both transmissions and receptions by the UE may not be expected. In some aspects, if UE receptions and/or transmissions are not expected in the active BWP due to CSI-MGs, then rate-matching and/or dropping of the corresponding DL/UL signal may be carried out. A UE may be RRC configured as to whether or not the UE is to carry out rate-matching and/or dropping.

Figure 4:
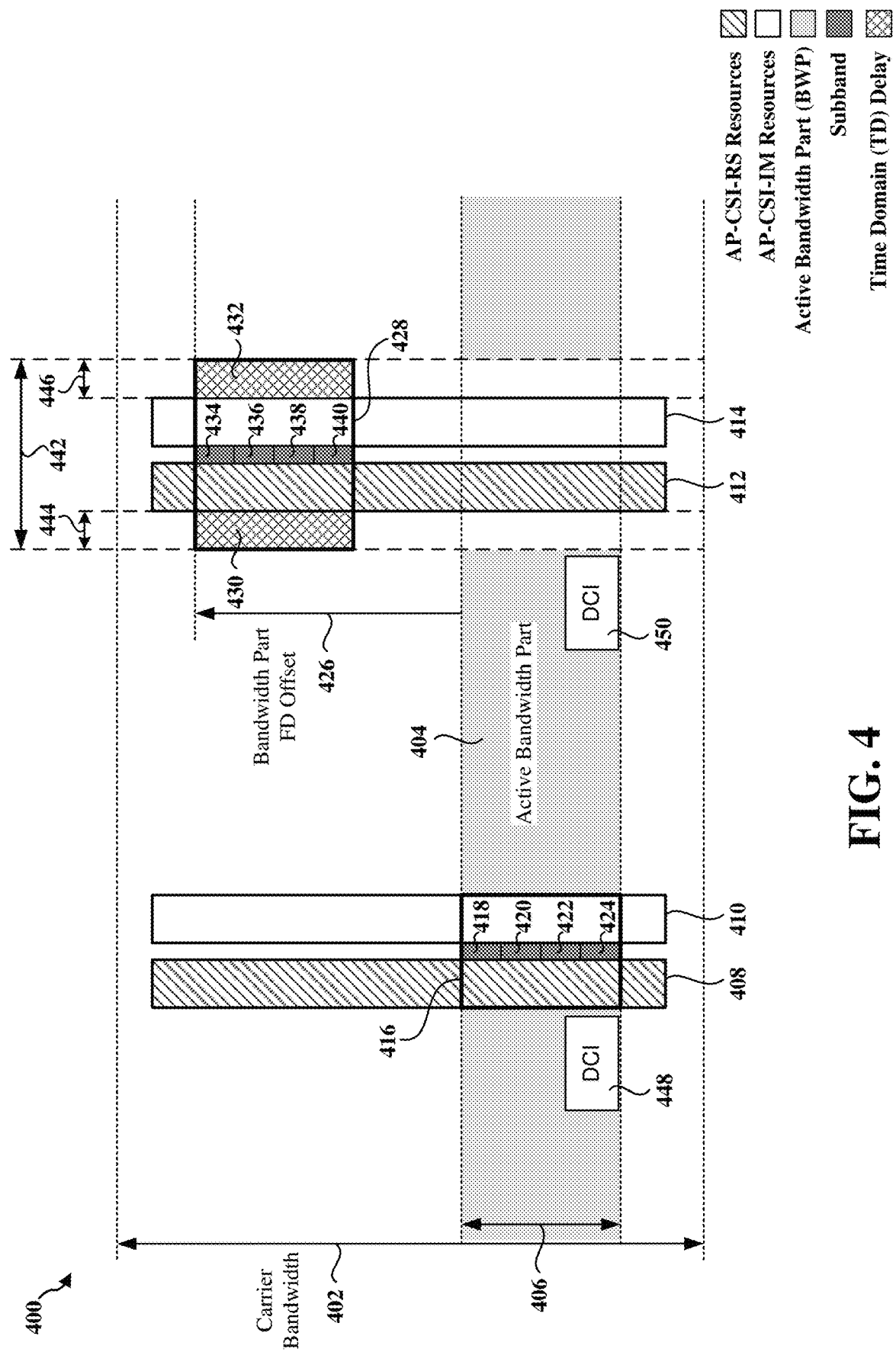
FIG. 4 is a diagram illustrating an example bandwidth part (BWP) frequency domain (FD) offset for dynamic channel state information measurement gaps (CSI-MGs) in accordance with various aspects of the disclosure.

Bandwidth Part (BWP) Frequency Domain (FD) Offset for Dynamic Channel State Information (CSI) Measurement Gaps FIG. 4 is a diagram 400 illustrating an example bandwidth part (BWP) frequency domain (FD) offset for dynamic channel state information measurement gaps (CSI-MGs) in accordance with various aspects of the disclosure. As shown in FIG. 4, a cell in a 5G NR network having a carrier bandwidth 402 (also referred to as a component carrier bandwidth 402) may configure a UE with an active BWP 404 (also referred to as the current active BWP 404). For example, the active BWP 404 may have a frequency range 406 that is less than the full carrier bandwidth 402. As shown in FIG. 4, the 5G NR network may configure channel state information (CSI) measurement resources 408, 410, 412, 414 within the carrier bandwidth 402. In some examples, the CSI resources 408 and 412 may be aperiodic channel state information (AP-CSI) resources, and the CSI resources 410 and 414 may be aperiodic channel state information interference measurement (AP-CSI-IM) resources.

In some examples, the CSI resources 408 and 410 may be CSI resources linked with a CSI report configuration triggered by first DCI 448. In FIG. 4, portions of the CSI resources 408, 410 within the current active BWP 404, which may be indicated to the UE via the first DCI 448, are shown in a first CSI resource region 416. In some examples, and as shown in FIG. 4, the first DCI 448 may further indicate one or more subbands (e.g., subbands 418, 420, 422, 424 within the first CSI resource region 416) for which the UE may report channel state information (CSI). For example, and as previously discussed, the one or more subbands may be indicated to the UE a CSI reporting band defined in a CSI reporting setting configuration (e.g., via RRC signaling).

In some aspects, the UE may be RRC configured with one or more BWP frequency domain (FD) offset options. Each BWP FD offset option may include a frequency domain (FD) offset value relative to the current active BWP of the UE. The FD offset value may be a number of resource block groups (RBGs), where the size of each RBG is the same as the RBGs of the current active BWP of the UE. In some aspects, the offset BWP may maintain the same parameters (e.g., RRC configuration) as the current active BWP. Each BWP FD offset option may correspond to a unique virtual bandwidth part identifier (BWP-ID). For example, each of the BWP FD offset options and the current active BWP may correspond to a different BWP-ID.

With reference to FIG. 4, for example, the UE may receive second DCI 450 (e.g., from a cell in the 5G NR network) that triggers aperiodic channel state information (AP-CSI) reports. Accordingly, in FIG. 4, the CSI resources 412, 414 may be linked with a CSI report configuration triggered by second DCI 450. For example, the second DCI 450 may include information indicating a BWP FD offset option (e.g., a BWP frequency domain (FD) offset 426) relative to the current active BWP 404. In some implementations, the BWP FD offset option may be indicated by a dedicated indicator in the second DCI 450. In other implementations, the BWP FD offset option may be indicated with a BWP-ID in the second DCI 450. In the aspects described herein, a BWP that has been offset relative to a current active BWP of the UE based on a BWP FD offset (e.g., BWP FD offset 426) may be referred to as an offset BWP.

In FIG. 4, portions of the channel state information (CSI) measurement resources 412, 414 within the offset BWP are shown in a second CSI resource region 428. FIG. 4 shows one or more subbands (e.g., subbands 434, 436, 438, 440 within the second CSI resource region 428) for which the UE, may report channel state information (CSI). For example, and as previously discussed, the one or more subbands may be indicated to the UE in a CSI reporting band defined in a CSI reporting setting configuration.

In some aspects of the disclosure, the UE may identify a dynamic channel state information measurement gap (CSI-MG) considering both the frequency domain occupation of the CSI measurement resources and other previously described criteria, such as the d-CSI-MG, f-d-CSI-MGL, and/or h-d-CSI-MGL. With reference to FIG. 4, for example, the UE may identify the dynamic channel state information measurement gap (CSI-MG) 442 considering the CSI resources 412, 414 along with the f-d-CSI-MGL 444 and h-d-CSI-MGL 446. In FIG. 4, the portion 430 represents a front-end dynamic CSI-measurement gap, and the portion 432 represents a back-end dynamic CSI-measurement gap. The portion 430 may serve as a first time domain (TD) delay that allows the UE to tune its antennas for communication over the offset BWP, while the portion 432 may serve as a second TD delay that allows the UE to tune its antennas for communication over the active BWP 404.

In some aspects of the disclosure, the UE may consider any CSI resources (e.g., including non-zero power channel state information reference signal (NZP-CSI-RS) resources and channel state information interference measurement (CSI-IM) resources) linked with any CSI report configurations triggered by the DCI to be associated with the offset BWP indicated in the DCI and not the current active BWP. In some aspects of the disclosure, it may be the responsibility of a serving base station (e.g., gNB) to guarantee that the frequency domain resource allocation (FDRA) (e.g., the previously described CSI frequency occupation) of such CSI resources is located within the offset BWP (e.g., within the second CSI resource region 428).

In some examples, the UE may determine the reporting subband configuration for the current active BWP (e.g., based on the previously described CSI reporting band) and may apply use the same reporting subband configuration for the offset BWP. In some examples, the UE may identify a reporting subband configuration for the offset BWP based on a CSI reporting band configuration dedicated for dynamic CSI-MGs. In these examples, the reporting subband for the offset BWP may be different from the reporting subband configuration for the current active BWP.

Implicit Indication of Measurement Frequency Domain (FD) Resources

As described with reference to FIG. 5, in some aspects of the disclosure, a UE in a 5G NR network may be triggered with a dynamic CSI-reporting DCI associated with CSI resources (e.g., including non-zero power channel state information reference signal (NZP-CSI-RS) resources and channel state information interference measurement (CSI-IM) resources), where the frequency domain resource allocation (FDRA) (e.g., the previously described starting resource block value, number of resource blocks value, and the CSI frequency occupation) of the CSI resources identifies frequency domain resources outside of the current active BWP of the UE. The UE may measure these CSI resources although the frequency domain (FD) resource identified is outside of the current active BWP of the UE. The UE may determine the FD range to be measured based on the starting resource block value, the number of resource blocks value, and the CSI frequency occupation of the CSI resources.

Figure 5:
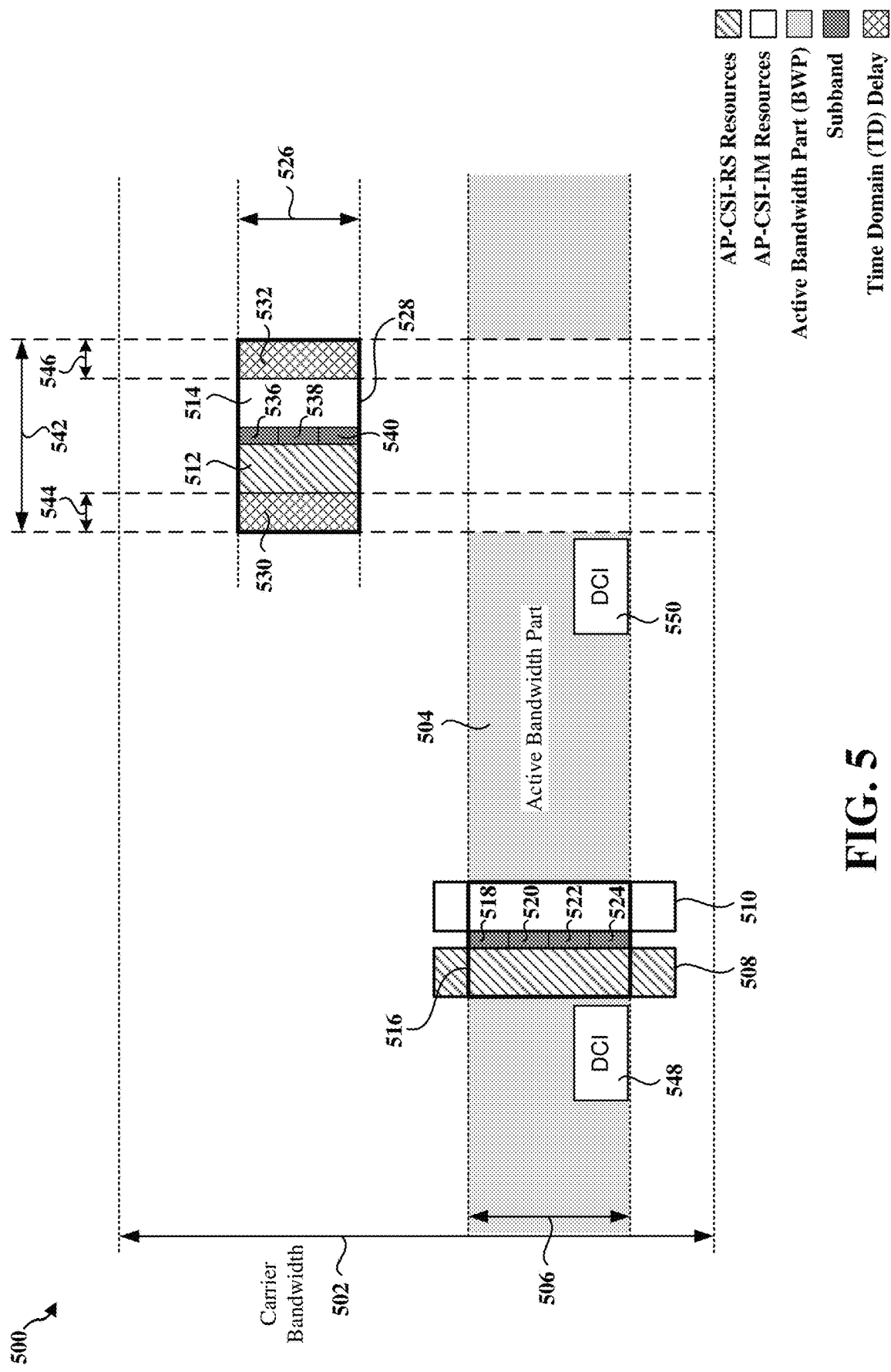
FIG. 5 is a diagram illustrating an implicit indication of channel state information (CSI) measurement frequency domain (FD) resources in accordance with various aspects of the disclosure.

FIG. 5 is a diagram 500 illustrating an implicit indication of measurement frequency domain (FD) resources in accordance with various aspects of the disclosure. As shown in FIG. 5, a cell in a 5G NR network having a carrier bandwidth 502 may configure a UE with an active BWP 504 (also referred to as the current active BWP 504). As shown in FIG. 5, the 5G NR network may configure CSI resources 508, 510 within the carrier bandwidth 502. In some examples, the CSI resources 508 may be aperiodic channel state information (AP-CSI) resources, and the channel state information (CSI) measurement resources 510 may be aperiodic channel state information interference measurement (AP-CSI-IM) resources.

In some examples, the CSI resources 508, 510 may be CSI resources linked with a CSI report configuration triggered by first DCI 548. In FIG. 5, portions of the CSI resources 508, 510 within the current active BWP 504 are shown in a first CSI resource region 516. FIG. 5 shows one or more subbands (e.g., subbands 518, 520, 522, 524 within the first CSI resource region 516) for which the UE may report channel state information (CSI). For example, and as previously discussed, the one or more subbands may be indicated to the GE in a CSI reporting band defined in a CSI reporting setting configuration.

With reference to FIG. 5, for example, the UE may receive second DCI 550 (e.g., from a cell in the 5G NR network) that triggers aperiodic channel state information (AP-CSI) reports. Accordingly, in FIG. 5, the CSI resources 512, 514 may be linked with a CSI report configuration triggered by the second DCI 550 Therefore, the UE may measure these CSI resources 512, 514 although the frequency domain (FD) resource identified is outside of the current active BWP 504 of the UE. For example, the UE may determine the frequency domain (FD) range 526 to be measured based on the starting resource block value, the number of resource blocks value, and the CSI frequency occupation of the CSI resources.

In FIG. 5, the channel state information (CSI) measurement resources 512, 514 configured outside of the current active BWP 504 of the UE are shown in a second CSI resource region 528. FIG. 5 shows one or more subbands (e.g., subbands 536, 538, 540 within the second CSI resource region 528) for which the UE may report channel state information (CSI). For example, and as previously discussed, the one or more subbands may be indicated to the UE in a CSI reporting band defined in a CSI reporting setting configuration.

In some aspects of the disclosure, the UE may identify a dynamic channel state information measurement gap (CSI-MG) considering both the CSI measurement resources and other previously described criteria, such as the d-CSI-MG, f-d-CSI-MGL, b-d-CSI-MGL. With reference to FIG. 5, for example, the UE may identify the dynamic channel state information measurement gap (CSI-MG) 542 considering the CSI resources 512, 514 along with the f-d-CSI-MGL 544 and b-d-CSI-MGL 546. In FIG. 5, the portion 530 represents a front-end dynamic CSI-measurement gap, and the portion 532 represents a back-end dynamic CSI-measurement gap. The portion 530 may serve as a first time domain (TD) delay that allows the UE to tune its antennas for communication over the FD range 526, while the portion 532 may serve as a second TD delay that allows the UE to tune its antennas for communication over the active BWP 504.

In some aspects of the disclosure, the UE may not be expected to measure other activated and/or triggered CSI resources that include a frequency domain resource allocation (FDRA) which overlap with the current active BWP. Accordingly, in some examples, the UE may not be expected to transmit CSI report(s) associated with these CSI resources.

UE Capabilities

In some examples, a UE in a 5G NR network may report one or more of the following capabilities of the UE: a) whether dynamic CSI-MG is supported b) time domain radio frequency retuning capabilities (e.g., a minimum supported value of f-d-CSI-MGL and a minimum supported value of f-d-CSI-MGL) c) frequency domain (FD) radio frequency (RF) retuning capabilities. In some examples, the minimum supported value of f-d-CSI-MGL and the minimum supported value of b-d-CSI-MGL may be reported by a same value or different values. In some examples, the frequency domain radio frequency retuning capabilities may include the maximum frequency domain offset value supported for a BWP.

Periodic Channel State Information (CSI) Measurement Resources and Semi-Persistent Channel State Information (SPS-CSI) Resources In some aspects of the disclosure, periodic channel state information (CSI) measurement resources and semi-persistent channel state information (SPS-CSI) resources may be linked with an aperiodic-CSI triggered CSI report configuration. The CSI report configuration may include a BWP frequency domain (FD) offset. The UE may measure the periodic channel state information (CSI) measurement resources and/or semi-persistent channel state information (SPS-CSI) resources after receiving the trigger DCI, provided that the frequency domain resource allocation of the periodic channel state information (CSI) measurement resources and/or the semi-persistent channel state information (SPS-CSI) resources are outside of the current active BWP. In some examples, the UE may not know that there was a BWP FD offset before receiving the trigger DCI including the BWP FD offset command. Thus, the UE may measure the CSI resources received after the trigger DCI.

Figure 6:
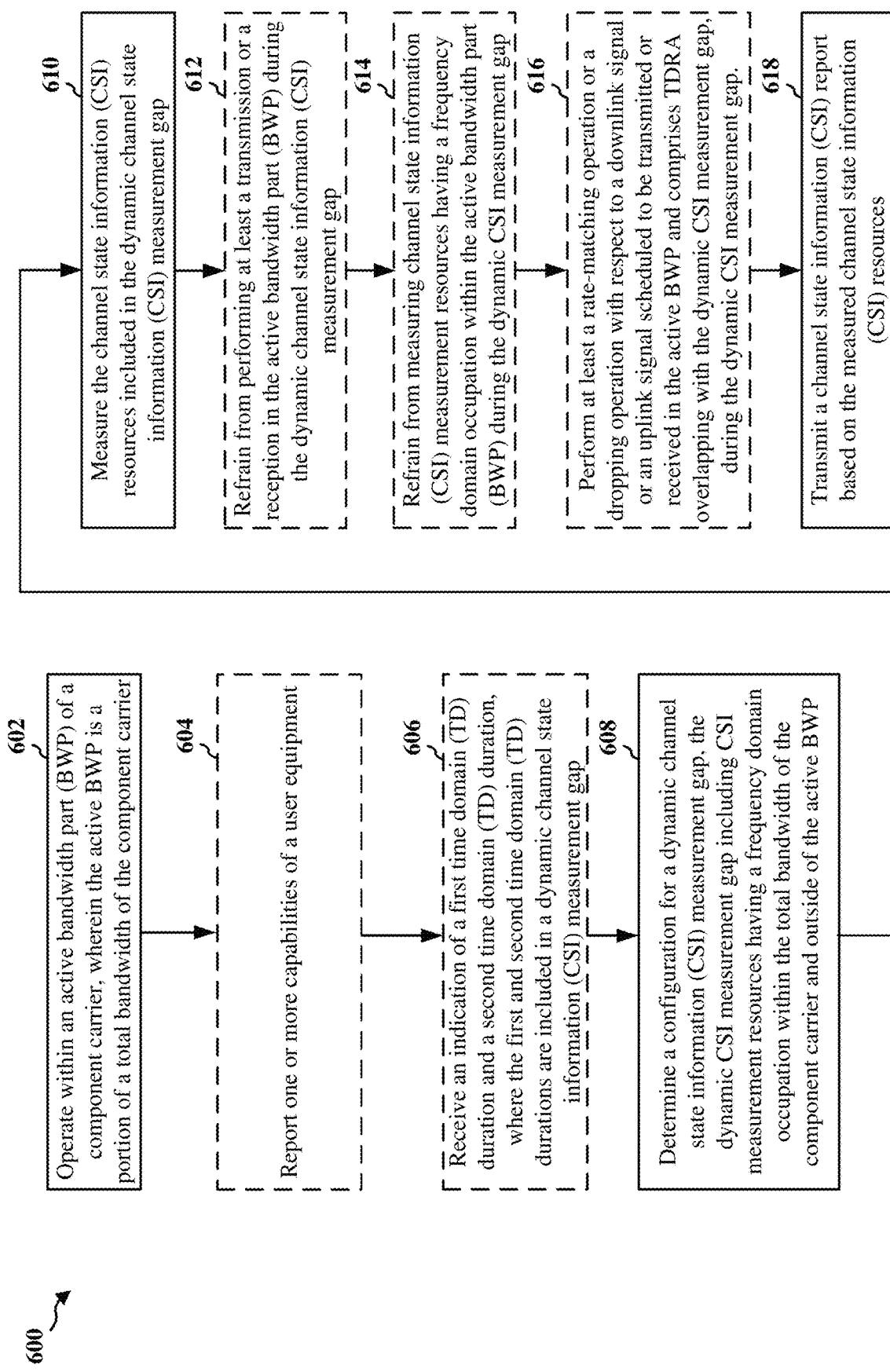
FIG. 6 is a flowchart of a method of wireless communication.

FIG. 6 is a flowchart 600 of a method of wireless communication. The method may be performed by a UE (e.g., the UE 104; the apparatus 702/702'; the processing system 814, which may include the memory 360 and which may be the entire UE 104 or a component of the UE 104, such as the TX processor 368, the RX processor 356, and/or the controller/processor 359). In FIG. 6, blocks shown with dashed lines represent optional blocks.

At 602, the UE operates within an active bandwidth part (BWP) of a component carrier, wherein the active BWP is a portion of a total bandwidth of the component carrier. In some aspects, with reference to FIG. 4, the active BWP may be the active BWP 404. In other aspects, with reference to FIG. 5, the active BWP may be the active BWP 504.

At 604, the UE reports one or more capabilities of a user equipment, the one or more capabilities including at least information indicating whether the dynamic channel state information (CSI) measurement gap is supported, time domain radio frequency retuning capabilities including minimum supported values of a first time domain (TD) duration and a second time domain (TD) duration, wherein the values for the first and the second TD durations may be reported as a same value, or frequency domain (FD) radio frequency (RF) retuning capabilities.

At 606, the UE receives an indication of a first time domain (TD) duration (e.g., the f-d-CSI-MGL 444 or the f-d-CSI-MGL 544) and a second time domain (TD) duration (e.g., the b-d-CSI-MGL 446 or the b-d-CSI-MGL 546), wherein the first and second time domain (TD) durations are included in the dynamic channel state information (CSI) measurement gap (e.g., the CSI-MGL 442, 542). In some examples, the first time domain (TD) duration begins before a first symbol of a first channel state information (CSI) measurement resource in the channel state information (CSI) measurement resources, and the second time domain (TD) duration begins after a last symbol of a second channel state information (CSI) measurement resource in the channel state information (CSI) measurement resources.

At 608, the UE determines a configuration for a dynamic channel state information (CSI) measurement gap, the dynamic channel state information (CSI) measurement gap including channel state information (CSI) measurement resources having a frequency domain occupation within the total bandwidth of the component carrier and outside of the active BWP.

In some aspects of the disclosure, the UE determines the configuration for the dynamic channel state information (CSI) measurement gap by receiving one or more bandwidth part (BWP) frequency domain (FD) offset options (e.g., a BWP frequency domain (FD) offset 426), each of the bandwidth part (BWP) frequency domain (FD) offset options including a frequency domain (FD) offset value relative to the active bandwidth part (BWP), receiving downlink control information (DCI) indicating one of the one or more bandwidth part (BWP) frequency domain (FD) offset options, wherein the downlink control information (DCI) triggers a channel state information (CSI) report with respect to one or more of the channel state information (CSI) measurement resources, and determining an offset bandwidth part (BWP) based on the one of the one or more bandwidth part (BWP) frequency domain (FD) offset options, wherein the offset bandwidth part (BWP) overlaps with the frequency domain occupation of the one or more channel state information (CSI) measurement resources, and wherein the offset bandwidth part (BWP) and the active bandwidth part (BWP) are nonoverlapping. In some examples, the UE measures the CSI measurement resources by considering the CSI measurement resources are associated with the offset BWP.

In some examples, the frequency domain (FD) offset value indicates a number of resource block groups (RBGs). In some examples, each of the number of resource block groups (RBGs) indicated by the frequency domain (FD) offset value has a same size as each resource block group (RBG) in the active bandwidth part (BWP). In some examples, the offset bandwidth part (BWP) maintains same parameters as the active bandwidth part (BWP). The UE further receives downlink control information (DCI) indicating one of the one or more bandwidth part (BWP) frequency domain (FD) offset options, the downlink control information (DCI) configured to trigger a channel state information (CSI) report with respect to one or more of the channel state information (CSI) measurement resources. In some examples, the one or more of the channel state information (CSI) measurement resources includes non-zero power channel state information reference signal (NZP-CSI-RS) resources or channel state information interference measurement (CSI-IM) resources. The UE then determines an offset bandwidth part (BWP) based on the one of the one or more bandwidth part (BWP) frequency domain (FD) offset options. The offset bandwidth part (BWP) overlaps with the frequency domain occupation of the one or more channel state information (CSI) measurement resources. The offset bandwidth part (BWP) and the active bandwidth part (BWP) are nonoverlapping.

In other aspects of the disclosure, the UE determines the configuration for the dynamic channel state information (CSI) measurement gap by receiving downlink control information (DCI) that triggers a channel state information (CSI) report with respect to one or more of the channel state information (CSI) measurement resources, where the frequency domain occupation of each of the CSI measurement resources are determined from a starting physical resource block (PRB) value and a number of PRBs value configured for each of the CSI measurement resources, and wherein the determined frequency domain occupation of each of the CSI measurement resources are nonoverlapping with the active BWP, and where the dynamic channel state information (CSI) measurement gap is determined considering at least the frequency domain occupation of the CSI measurement resources. The measuring the channel state information (CSI) measurement resources may be performed notwithstanding that the frequency domain occupation of the CSI measurement resources is nonoverlapping with the active BWP.

In some examples, the frequency domain occupation may identify frequency domain resources (e.g., the frequency domain (FD) range 526 in FIG. 5) outside of the active bandwidth part.

At 610, the UE measures the channel state information (CSI) measurement resources included in the dynamic channel state information (CSI) measurement gap (e.g., in the second CSI resource region 428 or in the second CSI resource region 528). In some examples, the UE measures the channel state information (CSI) measurement resources included in the dynamic channel state information (CSI) measurement gap by determining a subband configuration indicating one or more subbands for measurement of the channel state information (CSI) measurement resources within the dynamic channel state information (CSI) measurement gap, and measuring the channel state information (CSI) measurement resources included in the dynamic channel state information (CSI) measurement gap based on the one or more subbands. In some examples, the UE may determine the subband configuration by identifying a first subband configuration associated with the active BWP, or identifying a second subband configuration associated with the dynamic channel state information (CSI) measurement gap.

In some aspects of the disclosure, the channel state information (CSI) measurement resources included in the dynamic channel state information (CSI) measurement gap are periodic channel state information (CSI) measurement resources or semi-persistent channel state information (SPS-CSI) resources, and wherein the measuring the channel state information (CSI) measurement resources is triggered by downlink control information.

At 612, the UE refrains from performing at least a transmission or a reception in the active bandwidth part (BWP) during the dynamic channel state information (CSI) measurement gap.

At 614, the UE refrains from measuring channel state information (CSI) measurement resources having a frequency domain occupation within the active bandwidth part (BWP) during the dynamic channel state information (CSI) measurement gap.

At 616, the UE performs at least a rate-matching operation or a dropping operation with respect to a downlink signal or an uplink signal scheduled to be transmitted or received in the active BWP and comprises TDRA overlapping with the dynamic CSI measurement gap, during the dynamic channel state information (CSI) measurement gap.

Finally, at 618, the UE transmits a channel state information (CSI) report based on the measured channel state information (CSI) measurement resources.

Figure 7:
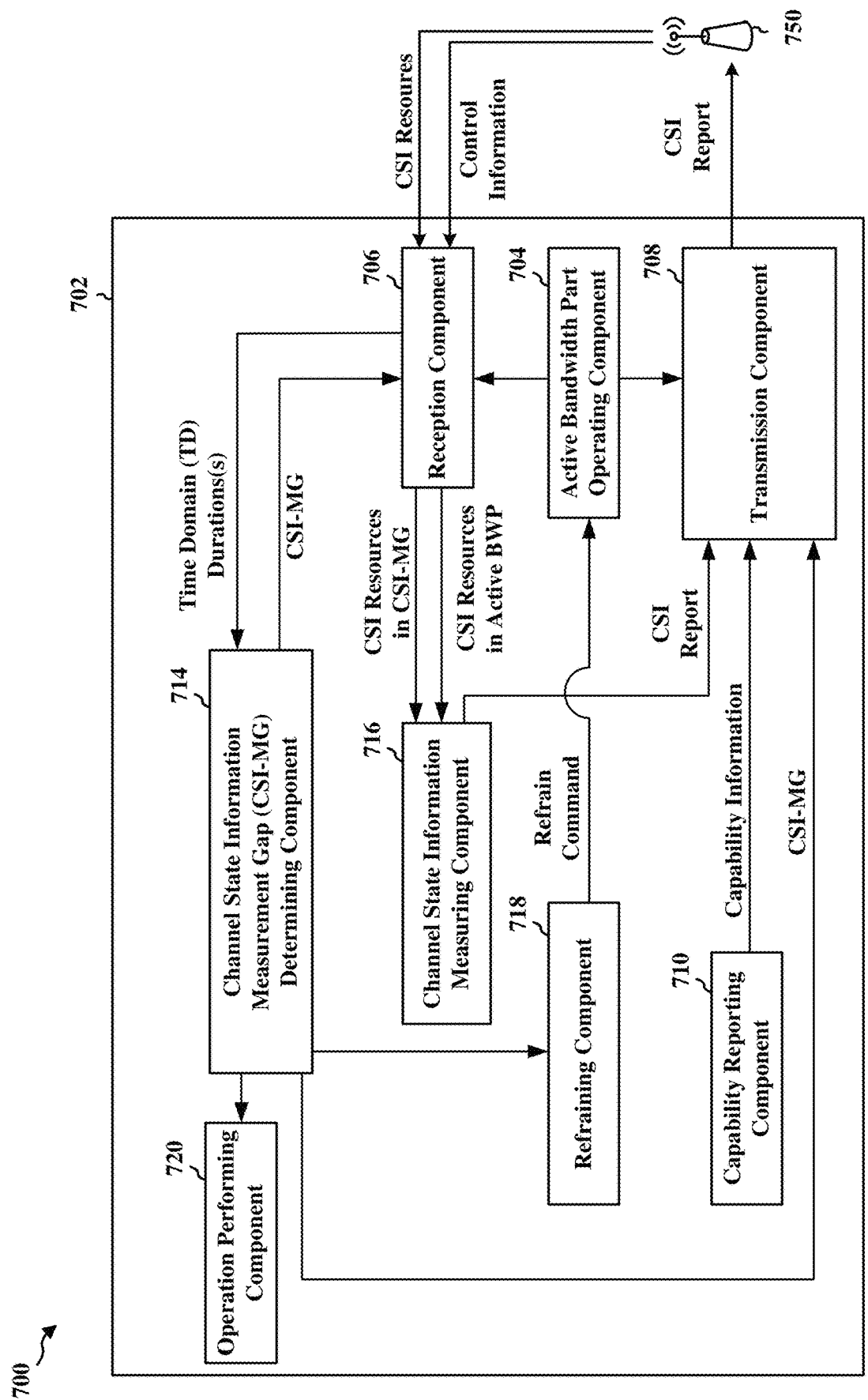
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a UE. The apparatus includes an active bandwidth part (BWP) operating component 704 that operates the UE within an active bandwidth part (BWP) of a component carrier. The active BWP is a portion of a total bandwidth of the component carrier. The apparatus further includes a reception component 706 that receives control information, such as DCI, an indication of a first time domain (TD) duration, and a second time domain (TD) duration, and that receives CSI resources (e.g., at least one channel state information reference signal (CSI-RS)). The first and second time domain (TD) durations are included in the dynamic channel state information (CSI) measurement gap. The apparatus further includes a transmission component 708 that transmits a channel state information (CSI) report based on the measured channel state information (CSI) measurement resources.

The apparatus further includes a capability reporting component 710 that reports one or more capabilities of a UE. The apparatus further includes a channel state information measurement gap (CSI-MG) determining component 714 that determines a configuration for a dynamic channel state information (CSI) measurement gap. The dynamic channel state information (CSI) measurement gap includes channel state information (CSI) measurement resources that are within the total bandwidth of the component carrier and outside of the active BWP. The apparatus further includes a channel state information measuring component 716 that measures the channel state information (CSI) measurement resources included in the dynamic channel state information (CSI) measurement gap.

The apparatus further includes a refraining component 718 that refrains from performing at least a transmission or a reception in the active bandwidth part (BWP) during the dynamic channel state information (CSI) measurement gap, and refrains from measuring channel state information (CSI) measurement resources that are within the active bandwidth part (BWP) during the dynamic channel state information (CSI) measurement gap. For example, the refraining component 718 may output a refraining command to achieve the previously described refraining operations. The apparatus further includes an operation performing component 720 that performs at least a rate-matching operation or a dropping operation with respect to a downlink signal or an uplink signal during the dynamic channel state information (CSI) measurement gap The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
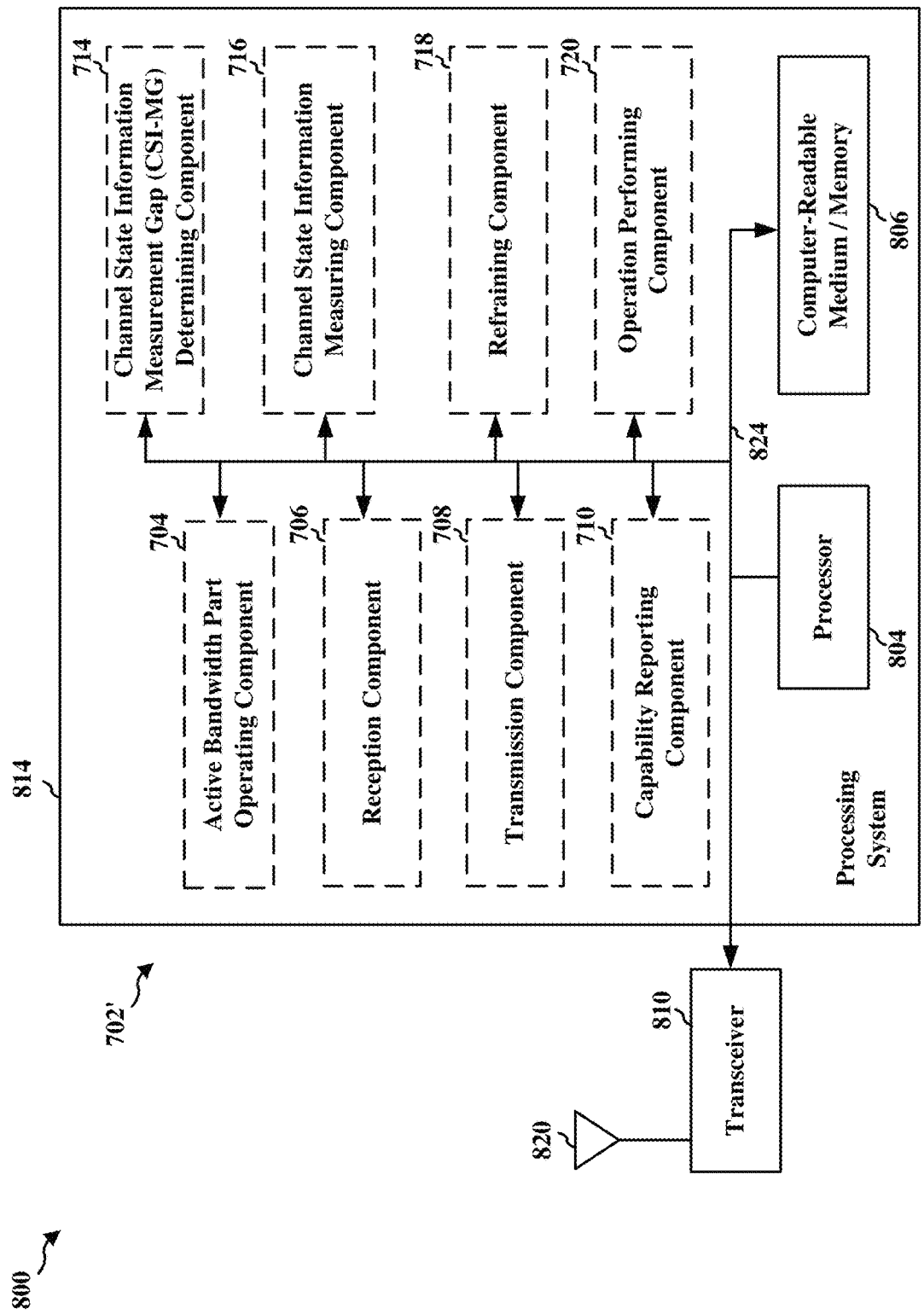
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 708. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for means for operating within an active bandwidth part (BWP) of a component carrier, wherein the active BWP is a portion of a total bandwidth of the component carrier, means for determining a configuration for a dynamic channel state information (CSI) measurement gap, the dynamic channel state information (CSI) measurement gap including channel state information (CSI) measurement resources having a frequency domain occupation within the total bandwidth of the component carrier and outside of the active BWP, means for measuring the channel state information (CSI) measurement resources included in the dynamic channel state information (CSI) measurement gap, means for transmitting a channel state information (CSI) report based on the measured channel state information (CSI) measurement resources, means for receiving an indication of a first time domain (TD) duration and a second time domain (TD) duration, means for refraining from performing at least a transmission or a reception in the active bandwidth part (BWP) during the dynamic channel state information (CSI) measurement gap, means for refraining from measuring channel state information (CSI) measurement resources having a frequency domain occupation within the active bandwidth part (BWP) during the dynamic channel state information (CSI) measurement gap, means for performing at least a rate-matching operation or a dropping operation with respect to a downlink signal or an uplink signal scheduled to be transmitted or received in the active BWP and comprises TDRA overlapping with the dynamic CSI measurement gap, during the dynamic channel state information (CSI) measurement gap, and/or means for reporting one or more capabilities of a user equipment. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The aspects described herein introduce dynamic channel state information (CSI) measurement gaps (CSI-MGs) that enable a UE to efficiently perform CSI measurements outside of its active bandwidth part (BWP) without requiring an RRC reconfiguration to switch to a different bandwidth part (BWP). The aspects described herein may reduce the previously discussed delays resulting from the reconfiguration of the current BWP and, therefore, may prevent degradation of the performance of the low complexity UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    operating within an active bandwidth part (BWP) of a component carrier, wherein the active BWP is a portion of a total bandwidth of the component carrier;

receiving an indication of a first time domain (TD) duration and a second TD duration, wherein the first and second TD durations are included in a dynamic channel state information (CSI) measurement gap;

determining a configuration for the dynamic CSI measurement gap, the dynamic CSI measurement gap including CSI measurement resources having a frequency domain occupation within the total bandwidth of the component carrier and outside of the active BWP;

measuring the CSI measurement resources included in the dynamic CSI measurement gap; and transmitting a CSI report based on the measured CSI measurement resources, wherein the first TD duration begins before a first symbol of a first CSI measurement resource in the CSI measurement resources, and wherein the second TD duration begins after a last symbol of a second CSI measurement resource in the CSI measurement resources.

2. The method of claim 1, further comprising:
refraining from performing at least a transmission or a reception in the active BWP during the dynamic CSI measurement gap.

3. The method of claim 1, further comprising:
refraining from measuring CSI measurement resources having a frequency domain occupation within the active BWP during the dynamic CSI measurement gap.

4. The method of claim 1, further comprising:
performing at least a rate-matching operation or a dropping operation with respect to a downlink signal or an uplink signal scheduled to be transmitted or received in the active BWP and comprises TDRA overlapping with the dynamic CSI measurement gap, during the dynamic CSI measurement gap.

5. The method of claim 1, wherein the determining the configuration for a dynamic CSI measurement gap includes:
receiving one or more BWP frequency domain (FD) offset options, each of the BWP FD offset options including a FD offset value relative to the active BWP;
receiving downlink control information (DCI) indicating one of the one or more BWP FD offset options, wherein the downlink control information (DCI) triggers a CSI report with respect to one or more of the CSI measurement resources; and
determining an offset BWP based on the one of the one or more BWP FD offset options, wherein the offset BWP overlaps with the frequency domain occupation of the one or more CSI measurement resources, and wherein the offset BWP and the active BWP are nonoverlapping.

6. The method of claim 5, wherein the measuring the CSI measurement resources comprises:
measuring the CSI measurement resources by considering the CSI measurement resources are associated with the offset BWP.

7. The method of claim 5, wherein each BWP FD offset option includes a BWP identifier (BWP-ID), and the DCI indicates the one of the one or more BWP FD offset options using the BWP-ID, and wherein the BWP-ID used in the DCI indication is an existing BWP-ID configured in the DCI for a dynamic BWP switch indication, or is separately provided in a new field in the DCI.

8. The method of claim 5, wherein the one or more of the CSI measurement resources includes non-zero power channel state information reference signal (NZP-CSI-RS) resources or channel state information interference measurement (CSI-IM) resources.

9. The method of claim 5, wherein the FD offset value indicates a number of resource block groups (RBGs).

10. The method of claim 9, wherein each of the number of RBGs indicated by the FD offset value has a same size as each RBG in the active BWP.

11. The method of claim 9, wherein the offset BWP maintains same parameters as the active BWP.

12. The method of claim 1, wherein the measuring the CSI measurement resources included in the dynamic CSI measurement gap includes:
determining a subband configuration indicating one or more subbands for measurement of the CSI measurement resources within the dynamic CSI measurement gap; and
measuring the CSI measurement resources included in the dynamic CSI measurement gap based on the one or more subbands.

13. The method of claim 12, wherein the determining the subband configuration includes:
identifying a first subband configuration associated with the active BWP; or
identifying a second subband configuration associated with the dynamic CSI measurement gap.

14. The method of claim 1, wherein the determining the configuration for a dynamic CSI measurement gap includes:
receiving downlink control information (DCI) that triggers a CSI report with respect to one or more of the CSI measurement resources, wherein
the frequency domain occupation of each of the CSI measurement resources are determined from a starting physical resource block (PRB) value and a number of PRBs value configured for each of the CSI measurement resources, and wherein the determined frequency domain occupation of each of the CSI measurement resources are nonoverlapping with the active BWP, and wherein
the dynamic CSI measurement gap is determined considering at least the frequency domain occupation of the CSI measurement resources.

15. The method of claim 14, wherein the measuring the CSI measurement resources is performed notwithstanding that the frequency domain occupation of the CSI measurement resources is nonoverlapping with the active BWP.

16. The method of claim 1, further comprising:
reporting one or more capabilities of a user equipment, the one or more capabilities including at least information indicating whether the dynamic CSI measurement gap is supported, time domain radio frequency retuning capabilities including minimum supported values of a first TD duration and a second TD duration, wherein the values for the first and the second TD durations may be reported as a same value, or FD radio frequency (RF) retuning capabilities.

17. The method of claim 13, wherein the CSI measurement resources included in the dynamic CSI measurement gap are periodic CSI measurement resources or semi-persistent channel state information (SPS-CSI) resources, and wherein the measuring the CSI measurement resources is triggered by downlink control information.

18. An apparatus for wireless communication, comprising:
a memory; and
at least one processor coupled to the memory and configured to:

operate within an active bandwidth part (BWP) of a component carrier, wherein the active BWP is a portion of a total bandwidth of the component carrier;

receive an indication of a first time domain (TD) duration and a second TD duration, wherein the first and second TD durations are included in a dynamic channel state information (CSI) measurement gap;

determine a configuration for the dynamic CSI measurement gap, the dynamic CSI measurement gap including CSI measurement resources having a frequency domain occupation within the total bandwidth of the component carrier and outside of the active BWP;

measure the CSI measurement resources included in the dynamic CSI measurement gap; and transmit a CSI report based on the measured CSI measurement resources, wherein the first TD duration begins before a first symbol of a first CSI measurement resource in the CSI measurement resources, and wherein the second TD duration begins after a last symbol of a second CSI measurement resource in the CSI measurement resources.

19. The apparatus of claim 18, wherein the at least one processor is further configured to:
refrain from performing at least a transmission or a reception in the active BWP during the dynamic CSI measurement gap.

20. The apparatus of claim 18, wherein the at least one processor is further configured to:
refrain from measuring CSI measurement resources having a frequency domain occupation within the active BWP during the dynamic CSI measurement gap.

21. The apparatus of claim 18, wherein the at least one processor is further configured to:
perform at least a rate-matching operation or a dropping operation with respect to a downlink signal or an uplink signal scheduled to be transmitted or received in the active BWP and comprises TDRA overlapping with the dynamic CSI measurement gap, during the dynamic CSI measurement gap.

22. The apparatus of claim 18, wherein the at least one processor configured to determine the configuration for a dynamic CSI measurement gap, is further configured to:
receive one or more BWP FD offset options, each of the BWP FD offset options including a FD offset value relative to the active BWP;
receive downlink control information (DCI) indicating one of the one or more BWP FD offset options, wherein the downlink control information (DCI) triggers a CSI report with respect to one or more of the CSI measurement resources; and
determine an offset BWP based on the one of the one or more BWP FD offset options, wherein the offset BWP overlaps with the frequency domain occupation of the one or more CSI measurement resources, and wherein the offset BWP and the active BWP are nonoverlapping.

23. The apparatus of claim 22, wherein the at least one processor configured to measure the CSI measurement resources is further configured to:
measure the CSI measurement resources by considering the CSI measurement resources are associated with the offset BWP.

24. The apparatus of claim 22, wherein each BWP FD offset option includes a BWP identifier (BWP-ID), and the DCI indicates the one of the one or more BWP FD offset options using the BWP-ID, and wherein the BWP-ID used in the DCI indication is an existing BWP-ID configured in the DCI for a dynamic BWP switch indication, or is separately provided in a new field in the DCI.

25. The apparatus of claim 22, wherein the one or more of the CSI measurement resources includes non-zero power channel state information reference signal (NZP-CSI-RS) resources or channel state information interference measurement (CSI-IM) resources.

26. The apparatus of claim 22, wherein the FD offset value indicates a number of resource block groups (RBGs).

27. The apparatus of claim 26, wherein each of the number of RBGs indicated by the FD offset value has a same size as each RBG in the active BWP.

28. The apparatus of claim 26, wherein the offset BWP maintains same parameters as the active BWP.

29. The apparatus of claim 18, wherein the at least one processor configured to measure the CSI measurement resources included in the dynamic CSI measurement gap is further configured to:
determine a subband configuration indicating one or more subbands for measurement of the CSI measurement resources within the dynamic CSI measurement gap; and
measure the CSI measurement resources included in the dynamic CSI measurement gap based on the one or more subbands.

30. The apparatus of claim 29, wherein the at least one processor configured to determine the subband configuration is further configured to:
identify a first subband configuration associated with the active BWP; or
identify a second subband configuration associated with the dynamic CSI measurement gap.

31. The apparatus of claim 18, wherein the at least one processor configured to determine the configuration for a dynamic CSI measurement gap is further configured to:
receive downlink control information (DCI) that triggers a CSI report with respect to one or more of the CSI measurement resources, wherein
the frequency domain occupation of each of the CSI measurement resources are determined from a starting physical resource block (PRB) value and a number of PRBs value configured for each of the CSI measurement resources, and wherein the determined frequency domain occupation of each of the CSI measurement resources are nonoverlapping with the active BWP, and wherein
the dynamic CSI measurement gap is determined considering at least the frequency domain occupation of the CSI measurement resources.

32. The apparatus of claim 31, wherein the measuring the CSI measurement resources is performed notwithstanding that the frequency domain occupation of the CSI measurement resources is nonoverlapping with the active BWP.

33. The apparatus of claim 18, wherein the at least one processor is further configured to:
report one or more capabilities of a user equipment, the one or more capabilities including at least information indicating whether the dynamic CSI measurement gap is supported, time domain radio frequency retuning capabilities including minimum supported values of a first TD duration and a second TD duration, wherein the values for the first and the second TD durations may be reported as a same value, or FD radio frequency (RF) retuning capabilities.

34. The apparatus of claim 30, wherein the CSI measurement resources included in the dynamic CSI measurement gap are periodic CSI measurement resources or semi-persistent channel state information (SPS-CSI) resources, and wherein the measuring the CSI measurement resources is triggered by downlink control information.

35. An apparatus for wireless communication, comprising:
- means for operating within an active bandwidth part (BWP) of a component carrier, wherein the active BWP is a portion of a total bandwidth of the component carrier;
- means for receiving an indication of a first time domain (TD) duration and a second TD duration, wherein the first and second TD durations are included in a dynamic channel state information (CSI) measurement gap;
- means for determining a configuration for the dynamic CSI measurement gap, the dynamic CSI measurement gap including CSI measurement resources having a frequency domain occupation within the total bandwidth of the component carrier and outside of the active BWP;
- means for measuring the CSI measurement resources included in the dynamic CSI measurement gap; and
- means for transmitting a CSI report based on the measured CSI measurement resources, wherein the first TD duration begins before a first symbol of a first CSI measurement resource in the CSI measurement resources, and wherein the second TD duration begins after a last symbol of a second CSI measurement resource in the CSI measurement resources.

36. A non-transitory computer-readable medium storing computer executable code, the code when executed by a processor cause the processor to:
- operate within an active bandwidth part (BWP) of a component carrier, wherein the active BWP is a portion of a total bandwidth of the component carrier;
- receive an indication of a first time domain (TD) duration and a second TD duration, wherein the first and second TD durations are included in a dynamic channel state information (CSI) measurement gap;
- determine a configuration for the dynamic CSI measurement gap, the dynamic CSI measurement gap including CSI measurement resources having a frequency domain occupation within the total bandwidth of the component carrier and outside of the active BWP;
- measure the CSI measurement resources included in the dynamic CSI measurement gap; and
- transmit a CSI report based on the measured CSI measurement resources, wherein the first TD duration begins before a first symbol of a first CSI measurement resource in the CSI measurement resources, and wherein the second TD duration begins after a last symbol of a second CSI measurement resource in the CSI measurement resources.

* * * * *